United States Patent Office 3,726,889
Patented Apr. 10, 1973

3,726,889
SYNTHESIS OF 2,2'-IMINOBIS(BENZOTHIAZOLES)
John J. D'Amico, Akron, Ohio, assignor to Monsanto Company, St. Louis, Mo.
No Drawing. Filed Jan. 28, 1971, Ser. No. 110,659
Int. Cl. C07d 91/46
U.S. Cl. 260—305
3 Claims

ABSTRACT OF THE DISCLOSURE 2,2'-iminobis(benzothiazoles) of the formula

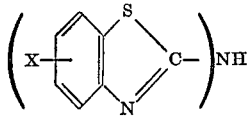

wherein X is hydrogen, alkyl, alkoxy, nitro, halo or hydroxy are prepared by reacting a 2-aminobenzenthiol with S,S'-di-(lower alkyl)cyanoimidodithiocarbonate.

This invention relates to 2,2'-iminobis(benzothiazoles), a new class of compounds useful in the vulcanization of rubber.

BACKGROUND OF THE INVENTION

Nirenburg et al. J. Gen. Chem. USSR 28 198 (1958), Davidson et al. J. Chem. Soc. 3327 (1963) and Davidson Chem. and Indus. 48 1977 (1965) reported the formation of N-aryl or alkyl-N'-cyano-S-methylisothioureas by the reaction of S,S'-dimethyl cyanoimidodithiocarbonate with an aromatic or aliphatic primary amine. However, it was found that reaction with aromatic primary amines containing a mercapto substituent in the ortho position furnished the previously unknown 2,2'-iminobis(benzothiazoles).

SUMMARY OF THE INVENTION

The compounds of this invention are characterized by the formula

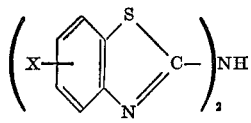

wherein X is hydrogen, alkyl, alkoxy, nitro, chloro, bromo, iodo or hydroxy and alkyl is preferably branched or unbranched lower alkyl of one to five carbon atoms. Examples are:

2,2'-iminobis(4-methylbenzothiazole),
2,2'-iminobis(5-ethylbenzothiazole),
2,2'-iminobis(5-butylbenzothiazole),
2,2'-iminobis(4-chlorobenzothiazole),
2,2'-iminobis(5-chlorobenzothiazole),
2,2'-iminobis(4-iodobenzothiazole),
2,2'-iminobis(5-bromobenzothiazole),
2,2'-iminobis(6-ethoxybenzothiazole),
2,2'-iminobis(6-nitrobenzothiazole), and
2,2'-iminobis(6-hydroxybenzothiazole).

The compounds of the aforesaid formula accelerate the vulcanization of rubber and are good secondary accelerators when used with other accelerators. More particularly the addition of the new compounds to sulfur-vulcanizable diene rubber in conjunction with a sulfur vulcanizing agent and primary accelerators decreases the time of cure when the rubber composition is heated at vulcanizing temperature but without decreasing the time for incipient vulcanization or scorch during mixing.

The rubber may be any diene rubber or mixture thereof whether natural or synthetic having sufficient unsaturation to be sulfur vulcanizable. Examples of suitable synthetic rubbers are styrene-butadiene copolymer (SBR), isobutylene-isoprene copolymer (butyl), ethylene-propylene diene terpolymer (EPDM), butadiene-acrylonitrile copolymer (nitrile), polymers of chloroprene (neoprene) and synthetic polybutadiene, partcularly cispolyisoprene and cis-polybutadiene.

The primary accelerators may comprise any of the vulcanization accelerators and mixtures thereof known to the art. The new compounds are particularly applicable for improving vulcanizable compositions containing mercaptothiazole accelerators of various classes and accelerator mixtures thereof. For example, rubber mixes containing as the primary accelerator a mercaptoarylene thiazole which accelerators include N-cyclohexyl-2-benzothiazole-sulfenamide, N,N-dialkyl-2-benzothiazolesulfenamide, 2-mercaptobenzothiazole, N - tert - butyl-2-benzothiazolesulfenamide, 2 - benzothiazolyl diethyldithiocarbamate, 2,2'-dithiobisbenzothiazole, 2-(morpholinothio)benzothiazole and 2-(morpholinodithio)-benzothiazole, amine salt of mercaptobenzothiazole, for example, the t-butylamine salt, or 2,6-dimethyl morpholine salt are substantially improved by addition of a 2,2'-iminobis(benzothiazole). The improvements extend to stocks containing antidegradants. Rubber mixes containing amine antidegradants, for example, N - 1,3-dimethylbutyl-N'-phenyl-p-phenylenediamine, N,N' - bis(1,4 - dimethylpentyl)-p-phenylenediamine and mixtures thereof, are substantially improved by the presence of the new compounds. Mixtures of antidegradants, for example, a mixture of N-1,3-dimethylbutyl-N'-phenyl-p-phenylenediamine and N,N'-bis(1,4-dimethylpentyl)-p-phenylenediamine, may be used with the activators of this invention.

For the purposes of this invention, sulfur-vulcanizing agent means elemental sulfur or sulfur-containing vulcanizing agent, for example, an amine disulfide or a polymeric polysulfide. The various types of sulfur-containing vulcanizing agents are known to those skilled in the art of rubber vulcanization.

The amount of the new 2,2'-iminobis(benzothiazoles) used to accelerate a vulcanizable composition containing a sulfur vulcanizing agent depends upon other components in the composition. When used as an accelerator alone, the amount depends upon the properties desired in the vulcanizate. Generally, the amount is between 0.1 to 5.0 parts by weight per 100 parts rubber with 0.5 to 1.5 parts being the normal amount. When used as a secondary accelerator along with another accelerator, the amount added is usually between 0.1 to 2.0 parts by weight with the preferred amount being between 0.2 to 0.5 part by weight.

DESCRIPTION OF PREFERRED EMBODIMENTS

The 2,2'-iminobis(benzothiazoles) are preferred by reacting one molecular proportion of S,S'-di(lower alkyl) cyanoimidodithiocarbonate with two molecular proportions of the appropriate o-aminobenzenethiol. The condensation is conveniently effected in an organic solvent, for example lower aliphatic alcohol, benzene, toluene or chloroform and the reaction hastened by mild heating to liberate by-product lower alkyl mercaptan and ammonia. The example below illustrates the preparation of the new compounds from which it will be appreciated that other examples are prepared in a similar manner by using substituted-o-aminobenzenethiol for o-aminobenzenthiol.

EXAMPLE 1

2,2'-iminobis(benzothiazole)

To a stirred slurry of 43.9 g. (0.3 mole) of S,S'-dimethyl cyanoimidodithiocarbonate [Hantzsch and Wolvenkamp. Ann. Chem. 321, 265 (1904)] in 600 ml. of ethyl alcohol, 75.2 g. (0.6 mole) of o-aminobenzenethiol is added in one portion at room temperature. After a few minutes a clear solution is obtained. The mixture is refluxed for five hours during which time a precipitate forms and methyl mercaptan and ammonia are liberated. After cooling to room temperature, the precipitate is recovered by filtration, washed with 100 ml. of heptane and air-dried at 25–30° C. 74 g. (87% yield) of 2,2'-iminobis(benzothiazole) is obtained which melts at 262–263° C. After recrystallization from dimethylformamide, the melting point remains unchanged. Analysis gives 14.70% N and 22.28% S compared to 14.83% N and 22.63% S calculated for $C_{14}H_9N_3S_2$. The product is insoluble in water, ether, acetone, chloroform, benzene, heptane, hexane and ethyl acetate and is soluble in dimethylformamide and dimethylsulfoxide. The pKa value of the product determined in a mixture of water and dimethylsulfoxide at 290° C. is $2.5 \times 10^{-10}$ which indicates that the substance is a weak acid.

Substituting 2-amino-5-chloro benzenethiol,
2-amino-4-chloro benzenethiol,
2-amino-4-nitro benzenethiol,
2-amino-5-hydroxy benzenethiol (4-amino-3-mercapto phenol),
2-amino-4-methyl benzenethiol (2-amino-p-toluenethiol),
2-amino-4-bromo benzenethiol 2-mercapto-5-bromo aniline) or
2-amino-5-ethoxy benzenethiol in the above procedure gives the corresponding 2,2'-iminobis(substituted-benzothiazole).

The following table illustrates the improved properties obtained by incorporating the new compounds into rubber. For all the rubber stocks tested, as illustrative of the invention, Mooney scorch times at 121° C. are determined by means of a Mooney plastometer. The time ($t_5$) in minutes required for the Mooney reading to rise five points above the minimum viscosity is recorded. Longer times on the Mooney Scorch test are indicative of greater processing safety. The cure characteristics of the stocks are determined by a Monsanto Oscillating Disk Rheometer at the indicated temperature. The time ($t_2$) in minutes required for a rise of two Rheometer units above the minimum reading and the time ($t_{90}$) required to obtain 90% of the Rheometer maximum torque are recorded. The difference ($t_{90}-t_2$) is indicative of the cure rate of the stock. Small values of $t_{90}-t_2$ indicate faster cure times. Vulcanizates are prepared by press curing the stocks at the indicated temperature for the time required to achieve optimum cure as determined from Rheometer data and the physical properties of the vulcanizates are measured and recorded. All parts are by weight.

TABLE I

| Stock number | 1 | 2 | 3 | 4 | 5 |
|---|---|---|---|---|---|
| Natural rubber smoked sheets | 100 | 100 | 100 | 100 | 100 |
| Furnace carbon black | 50 | 45 | 45 | 45 | 45 |
| Zinc oxide | 5 | 3 | 3 | 3 | 3 |
| Stearic acid | 3 | 2 | 2 | 2 | 2 |
| Hydrocarbon softener | 3 | 5 | 5 | 5 | 5 |
| N-(1, 3-dimethylbutyl)-N'-phenyl-p-phenylenediamine | 2 | 2 | 2 | 2 | 2 |
| N-tert-butyl-2-benzothiazolesulfenamide | | 0.5 | 0.5 | 0.5 | 0.5 |
| 2, 2'-iminobis(benzothiazole) | 0.5 | | 0.5 | 1.0 | 2.0 |
| Mooney scorch at 121° C.: $t_5$, min | 26.9 | 19.7 | 21.1 | 20.5 | 20.4 |
| Rheometer at 144° C.: | | | | | |
| $t_2$ | | 5.5 | 6.0 | 5.7 | 5.7 |
| $t_{90}-t_2$ | | 12.2 | 9.0 | 9.3 | 8.3 |
| Stress-strain data cured at 144° C.: | | | | | |
| Cure time, minutes | 120 | 30 | 25 | 25 | 25 |
| 300% modulus, p.s.i | 990 | 1,900 | 1,840 | 2,020 | 2,000 |
| Ultimate tensile strength, p.s.i | 1,700 | 3,800 | 3,960 | 4,040 | 3,700 |
| Ultimate elongation, percent | 410 | 500 | 510 | 500 | 48 |

Stock 1 illustrates the accelerator activity of the compounds of this invention. Stocks 2–5 illustrate the activity of the compounds of this invention as secondary accelerators. Stock 2 is a control stock containing a commercial accelerator alone. Stocks 3–5 have different amounts of a secondary accelerator of this invention added which addition enhances the vulcanization rate of the stocks. The increased vulcanization rate is shown by lower values of $t_{90}-t_2$ and by the shorter cure times. Similar results are obtained using other compounds of the invention and in synthetic rubber compositions. For example, a styrene-butadiene stock containing 2,2'-iminobis(benzothiazole) and N-tert-butyl-2-benzothiazolesulfenamide has a $t_{90}-t_2$ value of 16.0 versus a $t_{90}-t_2$ value of 17.7 obtained for a control stock containing no 2,2'-iminobis(benzothiazole).

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A method for preparing 2,2'-iminobis(benzothiazoles) which comprises reacting a 2-aminobenzenethiol with S,S'-di(lower alkyl)cyanoimidodithiocarbonate to produce a compound of the formula

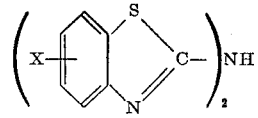

wherein X is hydrogen, lower alkyl, lower alkoxy, nitro, chloro, bromo, iodo or hydroxy.

2. A method of claim 1 wherein X is hydrogen.

3. A method of claim 2 wherein the cyanoimidodithiocarbonate reactant is S,S'-dimethyl cyanoimidodithiocarbonate.

References Cited

UNITED STATES PATENTS 3,228,888  1/1966  Spivack et al. _____ 252—402

OTHER REFERENCES

Brewster et al.: Chem. Abstracts, 30; 6737 (1936).

ALEX MAZEL, Primary Examiner

R. J. GALLAGHER, Assistant Examiner

U.S. Cl. X.R.

260—405.5, 779, 788